United States Patent [19]

Fingerle et al.

[11] 3,780,605

[45] Dec. 25, 1973

[54] GUIDING DEVICE, ESPECIALLY FOR SPLITTING AND BEVELING MACHINES

[75] Inventors: Karl Fingerle, Korb; Jurgen Haag, Stuttgart-Hedelfingen, both of Germany

[73] Assignee: Fortuna-Werke Maschinenfabrik Aktiengesellschaft, Stuttgart, Germany

[22] Filed: Sept. 11, 1972

[21] Appl. No.: 288,099

[30] Foreign Application Priority Data

Sept. 10, 1971 Germany.................... P 21 45 303.2

[52] U.S. Cl.............................. 83/4, 83/1, 83/422, 83/450
[51] Int. Cl.............................................. B26d 3/12
[58] Field of Search.......................... 83/4, 1, 422, 3, 83/450

[56] References Cited
UNITED STATES PATENTS 3,344,627  10/1967  Braun .................................. 83/4 X Primary Examiner—J. M. Meister
Attorney—Walter Becker

[57] ABSTRACT

A guiding device for splitting and beveling machines in which the material to be split or beveled is fed between a cutting member and a guiding element, said guiding device having a guiding part comprising at least a first guiding section forming the front guiding section when looking in the direction in which the material to be split or beveled is fed toward the cutting member and a second guiding section located behind the first guiding section when looking in the direction in which the material to be split or beveled is fed toward the cutting member. The arangement is such that the first guiding section is made of a synthetic material with a low coefficient of friction with regard to the material to be split or beveled, whereas the second guiding section is made of a hard metal.

9 Claims, 4 Drawing Figures

PATENTED DEC 25 1973 3,780,605
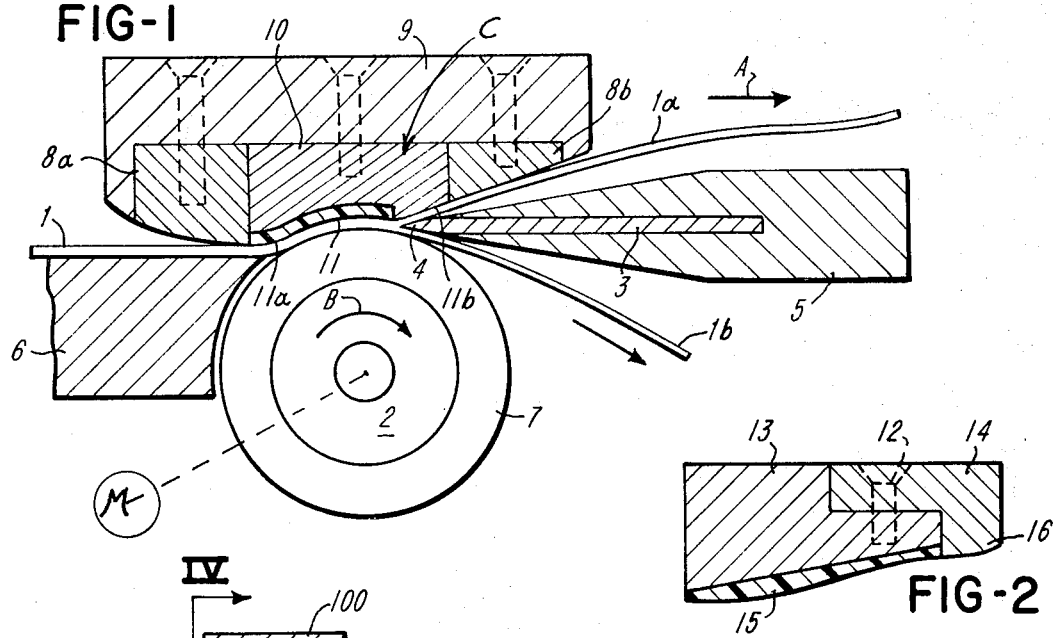
FIG-1
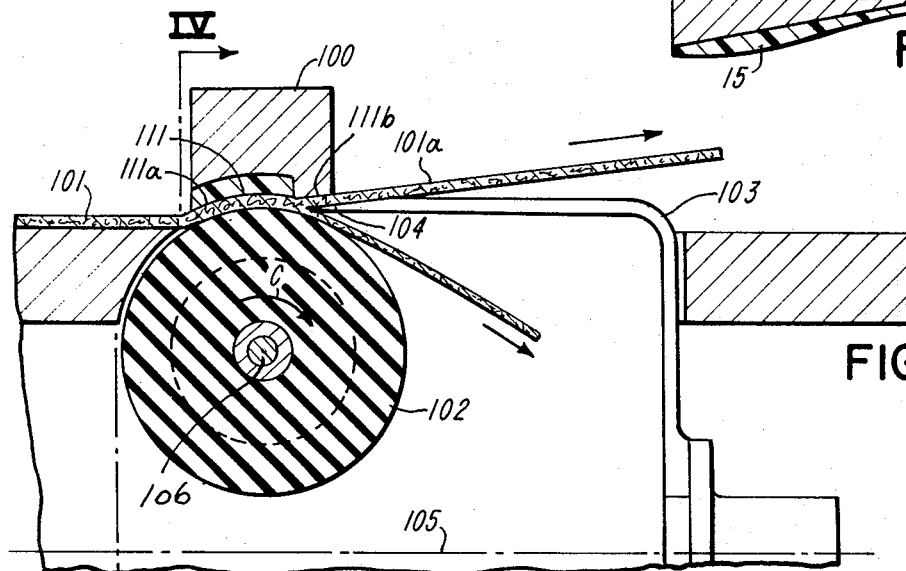
FIG-2
FIG-3
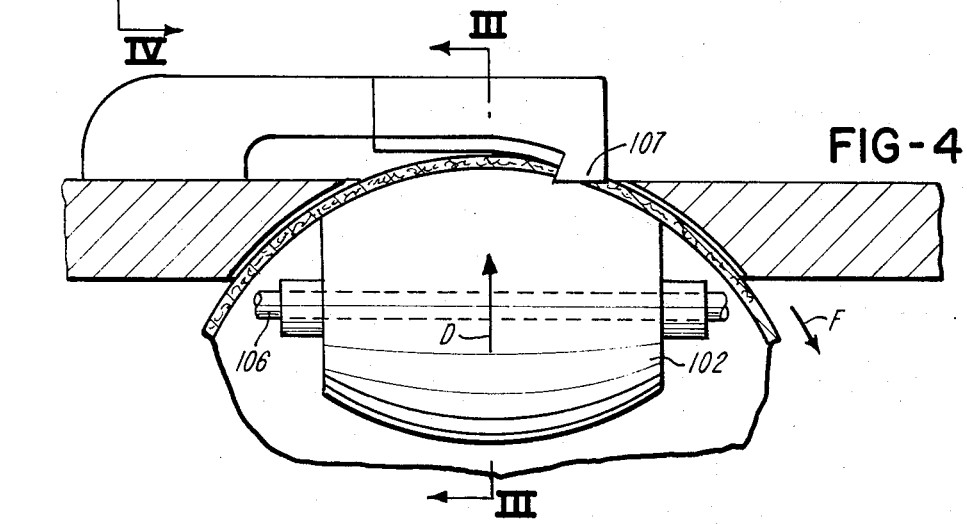
FIG-4

GUIDING DEVICE, ESPECIALLY FOR SPLITTING AND BEVELING MACHINES

The present invention relates to a guiding device, especially for splitting and beveling machines, in which the material to be machined carries out an advancing movement and is passed between a cutting element and a guiding device which is located in a predetermined spaced arrangement relative to the cutting element.

Splitting and beveling machines of the type involved preferably operate with a rotating belt knife and are employed primarily for a laminar dividing of soft foil-shaped, band-shaped, or plateshaped materials, such as leather, synthetic leather, rubber, and the like. Beveling machines of the type here involved in general have a bell-shaped or circular slitting knife as cutting element and are employed primarily for the shaping of the edges of upper leather parts in the shoe industry, which edges have a tapering cross section or end.

With all of the above mentioned machining operations there is encountered the problem of a precise guiding of the material to be machined within the region of the cutting edge of the cutting element. To solve this problem, a guiding device is provided which is adjustable and spaceable from the cutting edge of the cutting element in conformity with the respective requirements and the guiding surface of which with its distance from the cutting edge determines the thickness of the material which remains after the splitting or beveling and thus determines the complementary thickness of the chip cut off from the blank. Consequently, the precision of the thickness of the material and the cross sectional shape of the material as obtained by the splitting and beveling depends to a major extent on the precise shape and thus also on the wear resistance of the guiding surface of the guiding device. At the same time the requirement has to be met that the guiding surface has a low frictional effect relative to the material which is under a high pressure passing along the guiding surface because otherwise an unduly high braking and upsetting of the material will occur which might even result in the stopping of the advancing movement and thus might cause an interruption of the operation. This applies in particular to the customary feeding drives with a feeding element formed by a rotating friction roller or friction drum, which feeding element engages that surface of the material which is opposite to the guiding surface of the guiding device. In this connection, the friction between the material and the guiding surface must be considerably less than the friction between the material and the feeding element in order to assure a proper feeding or advance.

It is, therefore, an object of the present invention to provide a guiding device for the above referred to field of application which will make it possible to obtain a high wear resistance and thus a high shaping precision of the guiding surface even after a long period of operation while simultaneously the frictional effect between material and guiding surface is kept low.

This object and other objects and advantages of the invention will appear more clearly from the following specification in connection with the accompanying drawings, in which:

FIG. 1 illustrates in cross section the working range of a belt knife-splitting machine with a guiding device according to the invention.

FIG. 2 illustrates a cross section through a modified guiding device according to the invention for a belt knife-splitting machine.

FIG. 3 illustrates in cross section the working range of a bell knife-beveling machine with a guiding device according to the invention, said section being taken along the line III — III of FIG. 4.

FIG. 4 is a section taken along the line IV — IV of FIG. 3.

The guiding device according to the present invention is characterized primarily in that the guiding surface of the guiding device comprises at least two sections which, when viewed in feeding direction of the material to be processed, are located one behind the other. The guiding device according to the invention is furthermore characterized in that the first section representing the front section when viewing in feeding direction consists of synthetic material with a low friction coefficient relative to the material to be processed, whereas the second section which when viewing in feeding direction represents the rear section consists of hard metal.

Numerous tests have shown that the combination of a guiding surface section consisting of slidable synthetic material with a guiding surface section consisting of hard metal in the above mentioned sequence relative to the feeding direction furnishes excellent results as to the machining precision and a trouble-free operation. The guiding surface section which consists of slidable synthetic material absorbs a considerable portion of the pressing-on force exerted by the material, whereas the guiding surface section which consists of hard metal will assure a high precision of the splitting distance between the guiding surface and the cutting edge and will further assure that only a negligibly slight yieldability occurs with regard to the pressing-on pressure of the material.

An advantageous further development of the invention relates to a guiding element for splitting and beveling machines with a rotatable feed drive element which frictionally engages the surface of the material to be machined, and with a guiding element which engages the other surface of the material to be machined and acts as counter bearing for the pressure exerted by the feed drive element, and with a knife-like cutting element. This further development is characterized primarily in that the first section of the guiding surface is arranged within the region of the feed drive element, whereas the second section of the guiding surface is located within the range of the cutting edge of the cutting element. In this way the pressure of the feed drive element, for instance a friction roller or a friction drum, is limited to the highly slidable guiding surface section which has a low friction, whereas the guiding surface section consisting of hard metal need to absorb essentially only the remaining pressure between cutting element and material while at the same time assuring a maximum machining precision.

The guiding device according to the present invention may be further improved by designing that section of the guiding device which forms the second surface section as counter bearing supporting the synthetic material of the first guiding surface section in a direction opposite to the feeding direction of the material to be machined. This design makes it possible that also such materials may be employed for the first guiding surface section which wile having a low friction are frequently only to a minor degree resistant to deformation, while the metallic guiding surface section, due to its supporting effect, will prevent a yielding and, with many particularly favorable synthetic materials, a flowing or creeping thereof in feeding direction under the influence of the material passing therethrough. For this purpose there will suffice a width of the second guiding surface section which is considerably narrower than the width of the first guiding surface section so that a large pressing and engaging surface for a friction roller or the like will be available with a minor braking only of the material on the guiding surface. In this connection, as material for the first guiding surface section there is preferably employed polytetrafluoroethylene which has excellent sliding and wear-resistant properties because the flow and creep tendency of this material as caused by the material passing therethrough is reduced by the supporting effect of the second guiding surface section. For purposes of increasing the wear resistance of the metallic guiding surface section, a surface hardening or a hard metal reinforcement of the corresponding element of the guiding device may be provided.

Referring now to the drawings in detail, according to the device shown in FIG. 1, the foil-like material 1 to be split passes from a supporting table 6 through a working gap between a friction roller 2 serving as feed drive and provided with an elastic rubber mantle 7, on the one hand, and the guiding surface 11, on the other hand, of a strip-like guiding element 10 according to the invention. Within the end range of the working gap there is provided the cutting edge 4 of a cutting member in the form of a band knife 3 which rotates in a direction perpendicular to the drawing plane and which is mounted in the working range of the machine in a customary knife guiding means 5 not illustrated in detail. The distance between the cutting edge 4 and the guiding surface 11 determines the thickness of the material portion 1a leaving the machine whereas the split off portion or chip 1b leaves the machine below the belt knife 3.

The guiding surface 11, when viewing the material 1 in feeding direction as indicated by the arrow A, consists of two guiding surface sections 11a and 11b which are located one behind the other. The section 11a is located substantially within the range of the driving surface area of the friction roller 2, whereas the section 11b, is located primarily within the range of the cutting edge 4 of the belt knife 3. The profile of the two guiding surface sections is shaped in conformity with the corresponding surface of the oppositely located machine elements. More specifically, section 11 conforms in its starting or entrance portion to the surface of table 6 and subsequently to the circumferential curvature of the friction roller 2, while the profile curvature of the guiding surface section 11b in its first part conforms to the end portion of the section 11a and subsequently follows the inclination of the top side of the edge section of the belt knife 3.

The feeding of the material is effected by the friction roller 2 rotating in the direction of the arrow B. The surface of friction roller 2 is relatively strongly pressed against the material and engages the material within the range of the guiding surface section 11a. This pressure is absorbed by the guiding surface section 11a at a minimum of friction, the section 11a consisting of a relatively thin layer of polytetrafluoroethylene. In a direction counter to the feeding direction, this layer of synthetic material is supported by the shoulder of the guiding surface section 11b so that no undue deformation in view of the flow tendency of the synthetic material can occur. Together with a preceding guiding strip 8a and a following guiding strip 8b, the guiding device c is inserted into a holding strip and thus forms together therewith a guiding strip in the form of a compact structural unit which in customary non-illustrated manner is adjustably mounted on the machine frame.

The guiding element according to the present invention may, in conformity with FIG. 2, also be composed of two separate parts 13 and 14 which are interconnected by screws 12 so as to form a structural unit. This design in some instances yields advantages with regard to a precise machining of the supporting surface for a layer 15 of synthetic material representing the guiding surface section of low friction as well as with regard to a precise machining of the section 16 (FIG. 2) of the guiding device representing the rigid guiding surface section. Moreover, in some instances, this design facilitates the application of the layer of synthetic material.

If the metallic guiding surface section, especially according to FIG. 2, is not made of a hard material, it may expediently be subjected to a surface hardening, for instance, by chromizing, or by applying thereto a hard metal layer or a hard metal diffusion layer, or the like.

With the splitting machine according to FIGS. 3 and 4, a customary bell knife 103 with circular cutting edge 104 is provided as cutting element. Within the working range of the cutting edge 104 there is provided a rotatable friction roller 102 which serves as feed drive for the material 1 to be split. The friction roller 102 is in customary manner (therefore not shown in detail) rotatably journalled for rotation about the shaft 106 which extends in a direction transverse to the axis of rotation 105 of the bell knife 103. The friction roller 102 is rotated by a non-illustrated power drive in the direction of the arrow C. Moreover, the friction roller or the mounting therefor is arranged so as to yield in a direction transverse to its axis of rotation and is resiliently pressed against a non-illustrated abutment in the direction of the arrow D toward the cutting edge of the bell knife so as to be spaced from the cutting edge by a slight distance. Under the influence of the material 101 passing through the device, the friction roller 102 is thus able to escape downwardly, which means in a direction opposite to the arrow D, and presses the material upwardly against a guiding device according to the invention in the form of a guiding foot 100. The guiding device is in customary manner rigidly connected to the machine frame but is adjustable relative to the cutting edge 104. When viewing in feeding direction of the material 101 indicated by the arrow E, the guiding surface 111 is again composed of two sections 11a and 111b. Section 111a is formed by a layer of polytetrafluoroethylene, whereas the section 11b consists of hard metal and by its spacing from the cutting edge 104 determines the precise thickness of the processed material strand 101a leaving the device. The guiding surface 111, when viewing in the direction of the axis of rotation of the bell knife (FIG. 4), is arranged with decreasing distance from the cutting edge 104 in conformity with the desired wedge shape of the edge profile of the material 101 to be produced. For absorbing the lateral force which in view of the bell knife rotating in the direction of the arrow F acts upon the material, the guiding device 100 is provided with an extension 107 which at the same time supports the layer of synthetic material of the guiding surface section 111a against this lateral force which acts in the circumferential direction of the bell knife.

It is, of course, to be understood that the present invention is, by no means, limited to the specific showing in the drawings but also comprises any modifications within the scope of the appended claims. What we claim is:

1. In a splitting and beveling machine which comprises cutting means with a cutting edge for splitting foil-shaped and band-shaped and plate-shaped relatively soft material, supporting table means for supporting the material to be conveyed to and to be split by said cutting means, and conveying means interposed between said supporting table means and said cutting means and operable to convey the material to be split from said supporting table means to said cutting means, a guiding device which includes: a guiding member having a guiding portion extending in slightly spaced relationship to and along said supporting table means and said conveying means and confining therewith the guiding path for the material to be split, said guiding portion having at least two guiding sections which when viewed in the conveying direction of said conveying means are located one behind the other so that that one of said two sections which is closes t to said supporting table means forms the first guiding section and the other one of said two guiding sections forms the second guiding section, said first guiding section having a guiding surface formed by a synthetic material with a low coefficient of friction with regard to the material to be split, and said second guiding section having a guiding surface formed by a hard metal.

2. An arrangement according to claim 1, in which said conveying means includes a rotatable friction roller.

3. An arrangement according to claim 1, in which said first guiding section is located within the region of said conveying means whereas said secon guiding section is arranged within the region of the cutting edge of said cutting means.

4. An arrangement according to claim 1, in which said second guiding section forms a counter bearing supporting said first guiding section so as to exert a counter force thereon in a direction counter to the conveying direction of said conveying means.

5. An arrangement according to claim 1, in which the extension of said first guiding section measured in the conveying direction of said conveying means amounts to a multiple of the extension of said second guiding section measured in the conveying direction of said conveying means.

6. An arrangement according to claim 1, in which the two guiding sections of said guiding portion are formed by two guiding elements, and in which connecting means are provided firmly connecting said two guiding elements together.

7. An arrangement according to claim 1, in which said first guiding section has at least that area thereof which is intended for guiding contact with the material to be split made of polytetrafluoroethylene.

8. An arrangement according to claim 1, in which said second guiding section has that surface thereof surface hardened which is intended for guiding contact with the material to be split.

9. An arrangement according to claim 1, in which said second guiding section is provided with a hard metal reinforcement.

* * * * *